US006628497B1

(12) United States Patent
Napiorkowski et al.

(10) Patent No.: US 6,628,497 B1
(45) Date of Patent: Sep. 30, 2003

(54) OVERVOLTAGE PROTECTOR BRIDGE CIRCUIT

(75) Inventors: John J. Napiorkowski, Irving, TX (US); Josh M. Wilken, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 211 days.

(21) Appl. No.: 09/657,262

(22) Filed: Sep. 7, 2000

(51) Int. Cl.[7] .............................................. H02H 1/04
(52) U.S. Cl. ...................................... 361/119; 363/67
(58) Field of Search ......................... 361/56, 111, 119, 361/127, 91.1; 379/412, 331; 363/67, 68, 69, 70

(56) References Cited

U.S. PATENT DOCUMENTS

| | | | | | |
|---|---|---|---|---|---|
| 3,087,106 | A | * | 4/1963 | Baude et al. | 363/126 |
| 3,471,767 | A | * | 10/1969 | Parrish et al. | 363/70 |
| 4,234,966 | A | * | 11/1980 | Mosley et al. | 455/326 |
| 4,625,255 | A | | 11/1986 | Borkowicz et al. | 361/91 |
| 4,628,394 | A | | 12/1986 | Crosby et al. | 361/56 |
| 4,849,846 | A | | 7/1989 | Hung et al. | 361/56 |
| 4,868,703 | A | | 9/1989 | Borkowicz | 361/58 |
| 4,903,295 | A | | 2/1990 | Shannon et al. | 379/437 |
| 4,941,063 | A | | 7/1990 | McCartney et al. | 361/119 |
| 5,416,663 | A | | 5/1995 | Atkins | 361/119 |
| 5,493,469 | A | | 2/1996 | Lace | 361/119 |
| 5,539,820 | A | | 7/1996 | Pistilli | 379/412 |
| 5,623,388 | A | | 4/1997 | Chaudhry | 361/119 |
| 5,625,519 | A | | 4/1997 | Atkins | 361/93 |
| 5,790,363 | A | | 8/1998 | Chaudhry | 361/119 |
| 6,118,679 | A | * | 9/2000 | Smith | 363/70 |
| 6,172,864 | B1 | * | 1/2001 | Bremond et al. | 361/119 |

* cited by examiner

*Primary Examiner*—Adolf D. Berhane
(74) *Attorney, Agent, or Firm*—Christopher C. Dremann

(57) ABSTRACT

An overvoltage protector bridge circuit for protecting telecommunications equipment against voltage surges on transmission lines utilizes an overvoltage protection device in a bridge circuit having multiple diodes arranged in series or in parallel on each leg of the circuit. The overvoltage protection device conducts when it reaches a threshold voltage potential. The overvoltage protection device is electrically connected between a pair of connection nodes in the bridge circuit. The bridge circuit is made up of multiple diodes arranged along each of the legs of the circuit, which extend between the tip line and the ring line and the connection nodes. At least two diodes are arranged in series or in parallel along each leg of the bridge circuit to steer the excess voltage on the tip line or the ring line, or both, through the overvoltage protection device to ground. The use of multiple diodes on each leg of the bridge circuit reduces the effective off-state capacitance of the overvoltage protection device, thereby permitting the bridge circuit to be utilized for high frequency transmission line applications, and increases the overall surge current handling capability of the bridge circuit.

18 Claims, 1 Drawing Sheet

OVERVOLTAGE PROTECTOR BRIDGE CIRCUIT

TECHNICAL FIELD

This invention relates in general to overvoltage protectors, and more specifically, to an overvoltage protector bridge circuit for protecting against excess voltage in high frequency applications.

BACKGROUND ART

Overvoltage protectors are used with telephone lines to protect telecommunications equipment against excess voltage occurring on the outside lines, such as from lightning strikes or induction from power lines. The telephone company incoming lines are made up of a large number of twisted pairs of wires, one of the wires of each pair being referred to as a tip wire and the other a ring wire. A "crowbar" type overvoltage protector for each of the twisted pairs will connect to ground. In the event of excess voltage between the tip and ring wires, or between both the tip and ring wires and ground, the overvoltage protector will conduct, thereby creating a short to ground and diverting excess voltages and currents away from equipment and personnel.

There are different types of overvoltage protectors for high frequency applications. The two primary categories of overvoltage protectors for high frequency applications are: a clamping device, which holds the voltage to a specific threshold; and a crowbar device that shorts to ground when an overvoltage event occurs. In preventing damage from excess voltage, present practice allows for placement of overvoltage protectors that increase the ability to handle sustained or transient current. However, an overvoltage protector capable of achieving this goal often has a high off-state capacitance that causes attenuation and reflection at high frequencies, and thereby interferes with signal transmission. As presently designed, solid state overvoltage protectors having a lower off-state capacitance concomitantly have a decreased ability to handle excessive voltages.

One type of overvoltage protector presently in use is a gas tube. Electrical contacts are separated by a gap within a hermetically sealed chamber that is evacuated of air and filed with an inert gas. While gas tube overvoltage protectors work well at high frequencies due to very low off-state capacitance, repeated voltage surges will produce sputtering on the contacts. As a result, the protector will eventually require replacement.

Another type of overvoltage protector is a solid state overvoltage protector, such as a thyristor or metal oxide varistor (MOV). When a voltage above a preselected minimum is encountered, the solid state overvoltage protector conducts to ground. Solid state overvoltage protectors work well for moderate current loads and moderate frequencies. Furthermore, solid state overvoltage protectors, unlike gas tube protectors, are capable of repeatedly conducting to ground without incurring substantial damage. Solid state overvoltage protectors have also been used in bridge circuits that include diodes to steer the excess voltage. The diodes steer the excess voltage through the solid state overvoltage protector in the same direction regardless of whether the excess voltage is on the tip line relative to the ring line, on the ring line relative to the tip line, or on both the tip and the ring lines relative to ground.

Telephone lines are increasingly being used to transmit high frequency signals. Frequencies of 30 kilohertz to 30 megahertz are typically employed over telephone lines for data transmission. Solid state overvoltage protectors, and in particular thyristors and MOVs, have a fairly high capacitance, for example from about 70 to about 200 picofarads (pf). This high capacitance creates a problem with high frequency signals. High off-state capacitance will cause capacitive impedance mismatches on the twisted pair transmission line, which typically will result in high signal attenuation and reflectance (i.e., return loss) at high frequencies.

Present bridge circuit designs have legs connecting the tip and ring lines. Protection in such circuits is achieved by virtue of the diodes placed along the pathways guiding the excess a i voltage through a solid state overvoltage protector to ground. Thus, the diodes must be selected to carry the full overvoltage event or parallel diodes must be selected to share the full overvoltage event. Furthermore, diodes along the pathways to ground must be able to carry double the current of a single overvoltage event, as events occurring simultaneously on both the tip and ring conductor will use only one of those paths to ground. The implication of this diode selection limitation is that a diode to be placed on a leg of a bridge circuit having sufficient current handling capability will exceed the off-state capacitance requirements for high frequency applications.

DISCLOSURE OF THE INVENTION

In this invention, an overvoltage protector bridge circuit is provided in which the overall off-state capacitance is reduced to maintain the integrity of high-speed data transmission while preserving current handling capability. The bridge circuit incorporates multiple diodes in series or in parallel along each of the legs of the circuit, thereby reducing off-state capacitance while retaining the surge current handling capability of each leg. Placing multiple diodes in series along each leg of the bridge circuit reduces the off-state capacitance. Placing multiple diodes in parallel along each leg of the bridge circuit increases the surge current handling capability of each leg. Multiple configurations may be chosen from diodes of varying capacitance to optimize the protective characteristics of a particular bridge circuit while adding the capability of operating at high frequency with minimal attenuation and reflection. For example, multiple diodes in series may be placed along one or more legs of the bridge circuit while multiple diodes in parallel are placed along the remaining legs of the bridge circuit.

BEST MODE FOR CARRVINT OUT THE INVENTION

A solid state overvoltage protection device, such as a thyristor or MOV, is utilized in an overvoltage protector bridge circuit for high frequency applications. The solid state overvoltage protection device is incorporated into a bridge circuit including multiple diodes along each of the legs of the bridge circuit and steering diodes that provide pathways to ground for the current. In the present invention, at least two diodes are arranged in series or in parallel along each of the legs of the bridge circuit, which extend from the tip and ring lines to connection nodes at opposite corners of the bridge. When at least two diodes are arranged in series along a leg of the bridge circuit, the overall off-state capacitance is reduced. When at least two diodes are arranged in parallel along a leg of the bridge circuit, the surge current handling capability of the leg improves. In practice, the number of diodes on each leg of the bridge circuit and their configurations may be tailored to meet the needs of a particular circuit. The capacitances of the solid state overvoltage protection device and the steering diodes appear to have no significant overall effect on tip-to-ring off-state capacitance.

Figure 1:
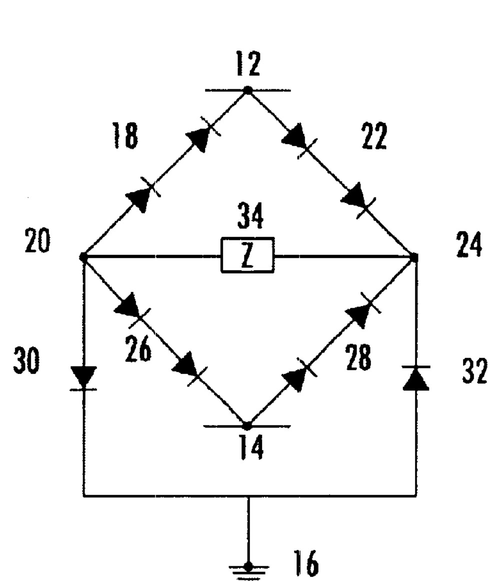
FIG. 1 is an electrical schematic of an overvoltage protector bridge circuit constructed in accordance with the principles of the invention.

Referring to FIG. 1, an overvoltage protector bridge circuit 10 is used for protecting against excess voltage that may occur on a tip line 12, on a ring line 14, or on both the tip and ring lines 12, 14 relative to ground 16. Bridge circuit 10 is typically installed between an incoming telephone line and the telecommunications equipment located at the user's facility. Bridge circuit 10 includes bridge legs between tip and ring lines 12, 14 and connection nodes 20, 24. A first set of diodes 18 consisting of at least two diodes arranged in series between tip line 12 and connection node 20 has anodes oriented to tip line 12 and cathodes oriented to connection node 20. A second set of diodes 22 consisting of at least two diodes arranged in series between tip line 12 and connection node 24 has cathodes oriented to tip line 12 and anodes oriented to connection node 24. A third set of diodes 26 consisting of at least two diodes arranged in series between ring line 14 and connection node 20 has anodes oriented to ring line 14 and cathodes oriented to connection node 20. A fourth set of diodes 28 consisting of at least two diodes arranged in series between tip line 14 and connection node 24 has cathodes oriented to ring line 14 and anodes oriented to connection node 24.

A first steering diode 30 between connection node 20 and ground 16 has its cathode oriented to connection node 20 and its anode oriented to ground 16. A second steering diode 32 between connection node 24 and ground 16 has its anode oriented to connection node 24 and its cathode oriented to ground 16. An overvoltage protection device 34 is electrically connected between connection node 20 and connection node 24. Overvoltage protection device 34 is preferably a solid state overvoltage protection device, and most preferably, is a conventional thyristor. However, overvoltage protection device 34 may also be a MOV, a zener diode, a gas tube, an air gap, or any other overvoltage protection device, or any combination of such devices for protecting against an overvoltage event. Overvoltage protection device 34 may be made of one or more of the above electrical components and will generally conduct once a preselected voltage threshold potential has been reached. Overvoltage protection device 34 typically has a fairly high capacitance, from about 70 to about 200 pf. Unless reduced, this capacitance would be detrimental to high frequency transmission on tip and ring lines 12, 14. Under normal operating conditions, the voltage on tip or ring lines 12, 14 will not be enough to cause overvoltage protection device 34 to conduct. The multiple diode arrangement along each leg of the bridge circuit 10 prevents any current flow to ground 16 unless overvoltage protection device 34 is conducting.

Figure 2:
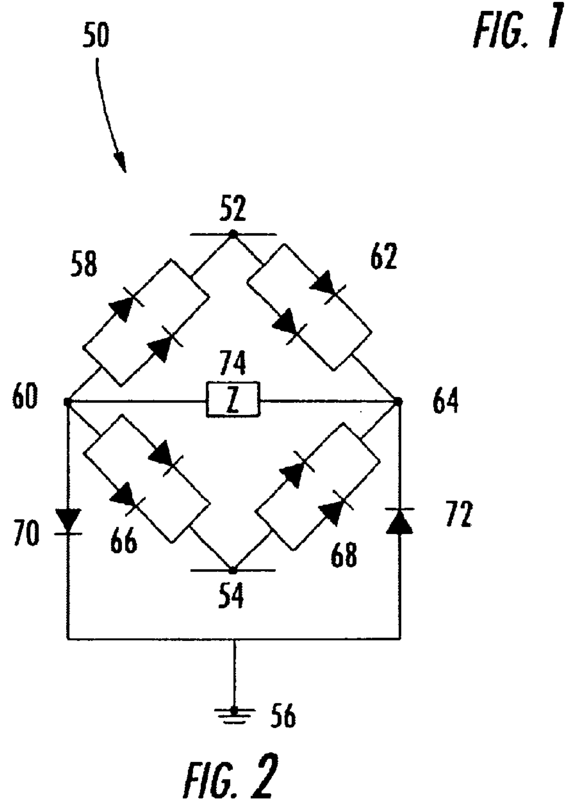
FIG. 2 is an electrical schematic of anialternative embodiment of an overvoltage protector bridge circuit constructed in accordance with the principles of the invention.

FIG. 2 illustrates an alternative embodiment of an overvoltage protector bridge circuit 50 that operates identically to the bridge circuit 10 described above and shown in FIG. 1. Bridge circuit 50, however, differs from bridge circuit 10 in that a set of at least two diodes is arranged in parallel along each leg of the circuit. A first set of diodes 58 consisting of at least two diodes arranged in parallel between tip line 52 and connection node 60 has anodes oriented to tip line 52 and cathodes oriented to connection node 60. A second set of diodes 62 consisting of at least two diodes arranged in parallel between tip line 52 and connection node 64 has cathodes oriented to tip line 52 and anodes oriented to connection node 64. A third set of diodes 66 consisting of at least two diodes arranged in parallel between ring line 54 and connection node 60 has anodes oriented to ring line 54 and cathodes oriented to connection node 60. A fourth set of diodes 68 consisting of at least two diodes arranged in parallel between tip line 54 and connection node 64 has cathodes oriented to ring line 54 and anodes oriented to connection node 64. A first steering diode 70 between connection node 60 and ground 56 has its cathode oriented to connection node 60 and its anode oriented to ground 56. A second steering diode 72 between connection node 64 and ground 56 has its anode oriented to connection node 64 and its cathode oriented to ground 56. An overvoltage protection device 74, as previously described, is electrically connected between connection node 60 and connection node 64. Unlike the diodes arranged in series along each leg of the bridge circuit 10, the diodes arranged in parallel along each leg of the bridge circuit 50 share the total current through each leg of the circuit equally. Accordingly, diodes having a lower surge current handling capability may be utilized.

Figure 3:
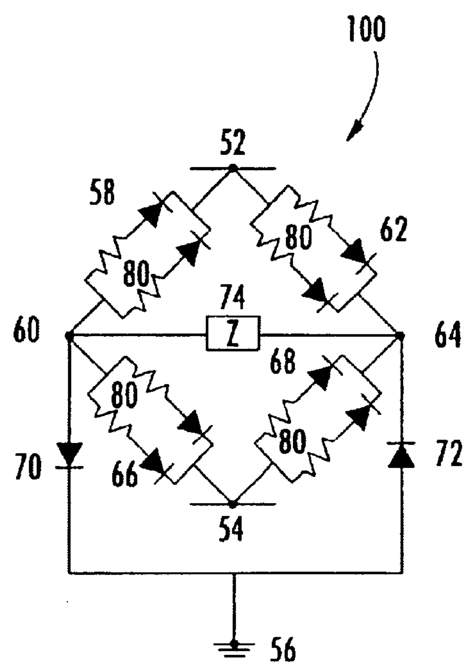
FIG. 3 is an electrical schematic of another alternative embodiment of an overvoltage protector bridge circuit constructed in accordance with the principles of the invention.

Another alternate embodiment of an overvoltage protector bridge circuit 100 is shown in FIG. 3. The parallel arrangement of diodes in each leg of the bridge circuit 100 includes a current-dividing resistor 80 placed in series with each diode of each set of diodes 58, 62, 66, 68 so that no single diode or set of diodes is required to carry current greater than its surge current handling capability. The same result may be accomplished by preselecting the various sets of diodes arranged in parallel along each of the legs of the circuit so that each diode begins to conduct current at the same time during a surge.

The invention has significant advantages. The provision of multiple diodes arranged in series or in parallel along each of the legs of a bridge circuit reduces the effective off-state capacitance of the overvoltage protection device and maintains the overall surge current handling capability of the bridge circuit. The total effective capacitance of the overvoltage protector bridge circuit can thereby be made low enough to allow high frequency transmission of up to about 30 MHz without significant attenuation or reflection, and in some configurations may allow high frequency transmission performance of up to about 100 MHz and beyond.

While the invention has been shown in various preferred embodiments, it should be apparent to those skilled in the art that it is not so limited, but instead is susceptible to various improvements and modifications without departing from the scope of the invention. Those skilled in the art will readily appreciate that an overvoltage protector bridge circuit according to the invention may also be constructed by configuring the circuit with any combination of the arrangements of diodes described above along each of the legs of the circuit. For example, an overvoltage protector bridge circuit according to the invention may be configured with at least two diodes arranged in series along one leg and at least two diodes arranged in parallel along each of the remaining legs of the circuit. Thus, any combination of the arrangements described above is within the intended scope of the invention provided that at least two diodes are arranged in series, in parallel, or in parallel with series resisters, along each of the legs of the overvoltage protector bridge circuit.

That which is claimed is:

1. A bridge circuit electrically connected between a first electrical line and a second electrical line, the bridge circuit comprising:

a pair of connection nodes;

an overvoltage protection device electrically connected between the codnnoaon nodes;

a plurality of legs comprising a first leg extending between the first electrical line and one of the pair of connection nodes;

a second leg extending between the first electrical line and the other of the pair of connection nodes;

a third leg extending between the second electrical line and the one of the pair of connection nodes; and a fourth leg extending between the second electrical line and the other of the pair of connection nodes; and at least two diodes electrically connected in series along each of the legs of the bridge circuit to thereby reduce the off-state capacitance of each leg of the bridge circuit.

2. A bridge circuit according to claim 1 wherein the first electrical line is a telephone tip line and the second electrical line is a telephone ring line.

3. A bridge circuit according to claim 2 wherein the pair of connection nodes comprises a first connection node and a second connection node; and the at least two diodes electrically connected along each of the legs of the bridge circuit comprise a first set of diodes arranged in series between the telephone tip line and the first connection node;

a second set of diodes arranged in series between the telephone tip line and the second connection node;

a third set of diodes arranged in series between the telephone ring line and the first connection node; and a fourth set of diodes arranged in series between the telephone ring line and the second connection node.

4. A bridge circuit according to claim 3 wherein the anodes of the first set of diodes are oriented to the telephone tip line and the cathodes of the first set of diodes are oriented to the first connection node;

the cathodes of the second set of diodes are oriented to the telephone tip line and the anodes of the second set of diodes are oriented to the second connection node;

the anodes of the third set of diodes are oriented to the telephone ring line and the cathodes of the third set of diodes are oriented to the first connection node; and the cathodes of the fourth set of diodes are oriented to the telephone ring line and the anodes of the fourth set of diodes are oriented to the second connection node.

5. A bridge circuit according to claim 3 further comprising a first steering diode electrically connected between the first connection node and ground; and a second steering diode electrically connected between the second connection node and ground.

6. A bridge circuit according to claim 5 wherein the cathode of the first steering diode is oriented to the first connection node and the anode of the first steering diode is oriented to ground; and the anode of the second steering diode is oriented to the second connection node and the cathode of the second steering diode is oriented to ground.

7. A bridge circuit electrically connected between a telephone tip line and a telephone ring line, the bridge circuit frthcer electrically connected to a ground for protecting against an excess voltage on the tip line relative to the ground, on the ring line relative to the ground, and on both the tip line and the ring line relative to the ground, the bridge circuit comprising:

a first connection node electrically connected to the tip line, the ring line, and the ground;

a second connection node electrically connected to the tip line, the ring line, and the ground;

a fist set of diodes electrically connected between the tip line and the first connection node, the first set of diodes comprising at least two diodes arranged in series to thereby reduce the off-state capacitance between the tip line and the first connection node;

a second set of diodes electrically connected between the tip line and the second connection node, the second set of diodes comprising at least two diodes arranged in series to thereby reduce the off-state capacitance between the tip line and the second connection node;

a third set of diodes electrically connected between the ring line and the first connection node, the third set of diodes comprising at least two diodes arranged in series to thereby reduce the off-state capacitance between the ring line and the first connection node;

a fourth set of diodes electrically connected between the ring line and the second connection node, the fourth set of diodes comprising at least two diodes arranged in series to thereby reduce the off-state capacitance between the ring line and the second connection node;

an overvoltage protection device electrically connected between the fist connection node and the second connection node;

a first steering diode electrically connected between the first connection node and the ground; and a second steering diode electrically connected between the second connection node and the ground;

whereby the overall off-state capacitance of the bridge circuit is reduced between the tip line and ground and between the ring line and ground.

8. A bridge circuit electrically connected between a telephone tip line and a telephone ring line, the bridge circuit further electrically connected to a ground for protecting against an excess voltage on the tip line relative to the ground, on the ring line relative to the ground, and on both the tip line and the ring line relative to the ground, the bridge circuit comprising:

a first connection node electrically connected to the tip line, the ring line, and the ground;

a second connection node electrically connected to the tip line, the ring line, and the ground;

a first set of diodes electrically connected between the tip line and the fits connection node, the first set of diodes comprising at least two diodes arranged in parallel to thereby improve the surge handling capability between the tip line and the first connection node;

a second set of diodes electrically connected between the tip line and the second connection node, the second set of diodes comprising at least two diodes arranged in parallel to thereby improve the surge handling capability between the tip line and the second connection node;

a third set of diodes electrically connected between the ring line and the first connection node, the third set of diodes comprising at least two diodes arranged in parallel to thereby improve the surge handling capability between the ring line and the first connection node;

a fourth set of diodes electrically connected between the ring line and the second connection node, the fourth set of diodes comprising at least two diodes arranged in parallel to thereby improve the surge handling capability between the ring line and the second connection node;

an overvoltage protection device electrically connected between the first connection node and the second connection node;

a first steering diode electrically connected between the first connection node and the ground; and a second steering diode electrically connected between the second connection node and the ground;

whereby the overall surge handling capability of the bridge circuit is improved between the tip line and ground and between the ring line and ground.

9. A bridge circuit according to claim 8 wherein a current-dividing resistor is electrically connected in series with each of the at least two diodes of the first set of diodes, the second set of diodes, the third set of diodes, and the fourth set of diodes.

10. A bridge circuit electrically connected between a first electrical line and a second electrical line, the bridge circuit comprising:

a pair of connection nodes;

an overvoltage protection device electrically connected between the connection nodes;

a plurality of legs comprising a first leg ending between the first electrical line and one of the pair of connection nodes;

a second leg extending between the first electrical line and the other of the pair of connection nodes;

a third leg extending between the second electrical line and the one of the pair of connection nodes; and a fourth leg extending between the second electrical line and the other of the pair of connection nodes; and at least two diodes electrically connected in parallel along each of the legs of the bridge circuit to thereby improve the surge handling capability of each leg of the bridge circuit.

11. A bridge circuit according to claim 10 wherein the first electrical line is a telephone tip line and the second electrical line is a telephone ting line.

12. A bridge circuit electrically connected between a first electrical line and a second electrical line, the bridge circuit comprising:

a pair of connection nodes;

an overvoltage protection device electrically connected between the connection nodes;

a plurality of legs comprising a first leg extending between the first electrical line and one of the pair of connection nodes;

a second leg extending between the first electrical line and the other of the pair of connection nodes;

a third leg extending between the second electrical line and the one of the pair of connection nodes; and a fourth leg extending between the second electrical line and the other of the pair of connection nodes; and at least two diodes electrically connected in series along at least one of the legs of the bridge circuit to thereby reduce the off-state capacitance of each leg of the bridge circuit; and at least two diodes electrically connected in parallel along at least one of the other legs of the bridge circuit to thereby improve the surge handling capability of each leg of the bridge circuit.

13. A bridge circuit according to claim 11 wherein the pair of connection nodes comprises a first connection node and a second connection node; and the at least two diodes electrically connected along each of the legs of the bridge circuit comprise a first set of diodes arranged in parallel between the telephone tip line and the first connection node;

a second set of diodes arranged in parallel between the telephone tip line and the second connection node;

a third set of diodes arranged in parallel between the telephone ring line and the fir connection node; and a fourth set of diodes arranged in parallel between the telephone ring line and the second connection node.

14. A bridge circuit according to claim 13 wherein the anodes of the first set of diodes are oriented to the telephone tip line and the cathodes of the first set of diodes are oriented to the first connection node;

the cathodes of the second set of diodes are oriented to the telephone tip line and the anodes of the second set of diodes are oriented to the second connection node;

the anodes of the third set of diodes are oriented to the telephone ring line and the cathodes of the third set of diodes are oriented to the first connection node; and the cathodes of the fourth set of diodes are oriented to the telephone ring line and the anodes of the fourth set of diodes are oriented to the second connection node.

15. A bridge circuit according to claim 13 further comprising a first steering diode electrically connected between the first connection node and ground; and a second steering diode electrically connected between the second connection node and ground.

16. A bridge circuit according to claim 15 wherein the cathode of the first steering diode is oriented to the first connection node and the anode of the first steering diode is oriented to ground; and the anode of the second steering diode is oriented to the second connection node and the cathode of the second steering diode is oriented to ground.

17. A bridge circuit according to claim 13 wherein a current-dividing resistor is electrically connected in series with each of the at least two diodes electrically connected along each of the legs of the bridge circuit.

18. A bridge circuit according to claim 12 wherein a current-dividing resistor is electrically connected in series with each of the at least two diodes arranged in parallel along at least one of the legs of the bridge circuit.

* * * * *

UNITED STATES PATENT AND TRADEMARK OFFICE

CERTIFICATE OF CORRECTION

PATENT NO. : 6,628,497 B1
DATED : September 30, 2003
INVENTOR(S) : John J. Napiorkowski and Josh M. Wilken It is certified that error appears in the above-identified patent and that said Letters Patent is hereby corrected as shown below:

Column 5,
Line 10, delete “codnnoaon” and add -- connection --.

Column 6,
Line 3, delete “frthcer” and add -- further --.
Line 12, delete “fist” and add -- first --.
Line 56, delete “fits” and add -- first --.

Column 7,
Line 33, delete “ending” and add -- extending --.

Signed and Sealed this

Twentieth Day of January, 2004

JON W. DUDAS
*Acting Director of the United States Patent and Trademark Office*